United States Patent
Taivalsaari et al.

(10) Patent No.: US 8,996,729 B2
(45) Date of Patent: Mar. 31, 2015

(54) METHOD AND APPARATUS FOR SYNCHRONIZING TASKS PERFORMED BY MULTIPLE DEVICES

(75) Inventors: Antero Taivalsaari, Siivikkala (FI); Lauri Paimen, Tampere (FI)

(73) Assignee: Nokia Corporation, Espoo (FI)

( * ) Notice: Subject to any disclaimer, the term of this patent is extended or adjusted under 35 U.S.C. 154(b) by 120 days.

(21) Appl. No.: 13/445,467

(22) Filed: Apr. 12, 2012

(65) Prior Publication Data

US 2013/0275625 A1 Oct. 17, 2013

(51) Int. Cl.
*G06F 15/16* (2006.01)
*G06Q 10/10* (2012.01)
*H04N 5/232* (2006.01)

(52) U.S. Cl.
CPC ......... *H04N 5/23203* (2013.01); *G06Q 10/101* (2013.01); *H04N 5/23216* (2013.01)
USPC ........................................................ 709/248

(58) Field of Classification Search
USPC .................. 709/248, 230, 228, 223; 370/503; 375/354
See application file for complete search history.

(56) References Cited

U.S. PATENT DOCUMENTS

| | | | |
|---|---|---|---|
| 8,214,747 B1 | 7/2012 | Yankovich et al. | |
| 8,255,360 B1 | 8/2012 | Wallace et al. | |
| 8,751,444 B2 | 6/2014 | Wallace et al. | |
| 2004/0117409 A1 | 6/2004 | Scahill et al. | |
| 2004/0150664 A1 | 8/2004 | Baudisch | |
| 2005/0028221 A1 | 2/2005 | Liu et al. | |
| 2005/0060179 A1* | 3/2005 | Tinberg et al. | 705/1 |
| 2005/0086309 A1 | 4/2005 | Galli et al. | |
| 2005/0168399 A1 | 8/2005 | Palmquist | |
| 2006/0284758 A1 | 12/2006 | Stilwell et al. | |
| 2007/0127426 A1* | 6/2007 | Watters et al. | 370/338 |
| 2007/0250645 A1* | 10/2007 | Meadows et al. | 709/248 |
| 2008/0160974 A1 | 7/2008 | Vartiainen et al. | |
| 2008/0207128 A1 | 8/2008 | Mikko | |
| 2009/0006946 A1* | 1/2009 | Hanson et al. | 715/255 |
| 2009/0172565 A1 | 7/2009 | Jackson et al. | |
| 2009/0204966 A1 | 8/2009 | Johnson et al. | |
| 2009/0213032 A1 | 8/2009 | Newport et al. | |

(Continued)

FOREIGN PATENT DOCUMENTS

| | | |
|---|---|---|
| EP | 1215575 A2 | 6/2002 |
| EP | 1760584 A1 | 3/2007 |

(Continued)

OTHER PUBLICATIONS

International Search Report and Written Opinion for Application No. PCT/FI2013/05198, dated Jun. 6, 2013.

(Continued)

*Primary Examiner* — Kostas Katsikis
(74) *Attorney, Agent, or Firm* — Alston & Bird LLP

(57) ABSTRACT

Provided herein is a method, which may include an indication that is received that a view of a task is presented by a first device. State information may be provided to a second device to permit the second device to be synchronized with the first device and to present a view of the task, either the same view or a different view than that presented by the first device. Information may also be received relating to a change in state of the task that is provided by one of the devices while a first view of the task is presented thereupon. Further, updated state information may be provided to another one of the devices to cause the other device to remain synchronized and to update a second view of the task that is presented.

20 Claims, 7 Drawing Sheets

(56) References Cited

U.S. PATENT DOCUMENTS

| | | | |
|---|---|---|---|
| 2009/0327302 A1* | 12/2009 | Richardson et al. | 707/10 |
| 2010/0066643 A1 | 3/2010 | King et al. | |
| 2010/0082136 A1 | 4/2010 | Rosenblatt et al. | |
| 2010/0185956 A1 | 7/2010 | Anantharaman et al. | |
| 2010/0231735 A1 | 9/2010 | Burian et al. | |
| 2011/0018982 A1 | 1/2011 | Shibamiya et al. | |
| 2011/0065384 A1 | 3/2011 | Cader et al. | |
| 2011/0158138 A1* | 6/2011 | Vivek | 370/310 |
| 2011/0197153 A1* | 8/2011 | King et al. | 715/769 |
| 2011/0289157 A1 | 11/2011 | Pirnazar | |
| 2012/0084356 A1 | 4/2012 | Ferdi | |
| 2012/0290657 A1 | 11/2012 | Parks et al. | |
| 2013/0013560 A1 | 1/2013 | Goldberg et al. | |
| 2013/0097234 A1 | 4/2013 | Beinvel et al. | |
| 2013/0262706 A1* | 10/2013 | Stahlberg et al. | 709/248 |
| 2013/0275994 A1* | 10/2013 | Uola et al. | 718/106 |

FOREIGN PATENT DOCUMENTS

| | | | |
|---|---|---|---|
| EP | 2106186 A1 * | 9/2009 | |
| EP | 2161960 A2 * | 3/2010 | |
| EP | 2261793 A2 | 12/2010 | |
| EP | 2385462 A1 | 11/2011 | |
| EP | 2487871 A1 | 8/2012 | |
| GB | 2468893 A * | 9/2010 | |
| GB | 2 498 229 A | 7/2013 | |
| WO | WO-2005/0051020 A1 | 6/2005 | |
| WO | WO-2005/0109829 A1 | 11/2005 | |
| WO | WO-2009/0152316 A1 | 12/2009 | |
| WO | WO-2010/0063873 A1 | 6/2010 | |
| WO | WO-2011/0127201 A1 | 10/2011 | |
| WO | WO 2013/097878 | 7/2013 | |

OTHER PUBLICATIONS

"Touch Gesture Reference Guide" [online][retrieved May 27, 2013] Retrieved from <URL: http://statice.lukew.com/TouchGestureGuide.pdf> 8 pages.

International Search Report for Application No. PCT/EP2011/074178 dated May 15, 2012.

International Search Report for Application No. PCT/EP2011/074182 dated Mar. 22, 2012.

International Search Report for Application No. PCT/EP2011/074193 dated Sep. 14, 2012.

International Search Report for Application No. PCT/US2012/071628 dated Feb. 9, 2013.

Search Report for Application No. GB1204842.7 dated May 25, 2012.

Search Report for Application No. GB1204849.2 dated May 25, 2012.

Search Report for Application No. GB1204857.5 dated May 25, 2012.

Bagrodia, R. et al., *iMash: Interactive Mobile Application Session Handoff*; Mobisys; The International Conference on Mobile Systems, Applications and Services (2003) pp. 1-14.

De Carvalho, L.G., et al., *Synchronizing Web Browsing Data with Browserver*, Computers and Communications ISSCC (2010) pp. 738-743.

*Understanding Home Sharing* [online][retrieved May 9, 2013] Retrieved from the Internet: <URL: http://support.apple.com/kb/HT3819 >.

*iTunes: How to Share Music and Video* [online][retrieved May 9, 2013] Retrieved from the Internet: <URL http://support.apple.com/kb/HT2688 >.

Chong, M. K. et al., *GesturePIN: Using Discrete Gestures for Associating Mobile Devices*, MobileHCI'10, Sep. 7-10, 2010, Lisbon, Portugal, pp. 261-264.

Menges, J. et al., *Inverting X: An Architecture for a Shared Distributed Window System*, (Proc., Third Workshop on Enabling Technologies: Intrastructure for Collaborative Enterpriseses, IEE Computer Society Press, Apr. 1994, pp. 53-64) pp. 1-11.

Peng, C. et al., *Point&Connect: Intention-based Device Pairing for Mobile Phone Users*, MobiSys'09, Jun. 22-25, 2009, Karkow, Poland, pp. 137-149.

Schuckmann, C. et al., *Modeling Collaboration Using Shared Objects*, GROUP 99, Phoenix, AZ, ACM 1999, pp. 189-198.

Shim, H. S. et al., *Providing Flexible Services for Managing Shared State in Collaborative Systems*, Proceedings of the Fifth European Conference on Computer Supported Cooperative Work, Kluwer Academic Publishers, Netherlands, 1997, pp. 237-252.

* cited by examiner

METHOD AND APPARATUS FOR SYNCHRONIZING TASKS PERFORMED BY MULTIPLE DEVICES

TECHNOLOGICAL FIELD

An example embodiment of the present invention relates generally to the synchronization of multiple devices and, more particularly, to the synchronization of a task executed by multiple devices.

BACKGROUND

It has become commonplace for people to utilize a number of communication devices in their daily activities. For example, a person may utilize a laptop computer, a mobile telephone and a tablet computer, sometimes concurrently, in order to perform various tasks. With the proliferation of digital content, the prevalence of applications and the growing importance of these communication devices in people's daily activities, it is anticipated that people will utilize even more communication devices on a more frequent basis in the future.

It would be desirable for the multiple communication devices utilized by a person to be synchronized and to interoperate with one another. In this manner, a person could choose the best or most readily available communication device to perform each task. However, it has proven challenging to maintain communication devices in synchronization with one another so as to facilitate the interoperability of the communication devices without requiring an undesired amount of manual effort. For example, a user may enter a new contact or a new note, such as a grocery shopping list, into one of the communication devices. However, the new contact or the new note is generally not automatically available or visible on the user's other communication devices. Similarly, a user may capture a new photograph with one of the communication devices, but the new photograph may not be automatically available or visible on the user's other communication devices. More generally, data, applications or the like that are stored on one of the user's communication devices are not generally available on the user's other communication devices without manually copying the data or applications from one communication device to another, or without explicit synchronization of the communication devices by the user.

Techniques have been developed for device pairing, such as the pairing of a Bluetooth™ headset with a mobile telephone. However, these techniques generally apply to specific pairs of communication devices and focus on the connectivity and/or networking issues. As such, people who utilize two or more communication devices may find it challenging to commence a task, e.g., an application, utilizing one of the communication devices and then continue work on the same task utilizing another communication device since the communication devices may not be readily synchronized, at least not without explicit synchronization required of the user.

BRIEF SUMMARY

A method, apparatus and computer program product have therefore been provided according to an example embodiment in order to facilitate synchronization of multiple devices. In this regard, the method, apparatus and computer program product of an example embodiment may facilitate the provision of the same or different views of the same task to be presented by two or more devices, thereby allowing a user to interact with the task utilizing either one or both of the devices. Additionally, the method, apparatus and computer program product of an example embodiment may facilitate sharing of state information relating to the task between the multiple devices utilized by a user in order to ensure that the instantiation of the task by each device is current and fully synchronized.

In one embodiment, a method is provided that includes receiving an indication that a view of a task is presented by a first device. The method of this embodiment also causes state information relating to the task to be provided to at least a second device to permit the second device be synchronized with the first device and to present a view of the task, such as the same or a different view than that presented by the first device. In this embodiment, the method also receives information relating to a change in state of the task that is provided by one of the first or second devices while a first view of the task is presented thereupon. Further, the method of this embodiment causes updated state information related to the task to be provided to another one of the first or second devices to cause the another device to remain synchronized and to update a second view of the task that is presented thereupon. The second view of the task may be the same or different than the first view of the task.

In another embodiment, an apparatus is provided that includes at least one processor and at least one memory including computer program code with at least one memory and the computer program code being configured to, with the processor, cause the apparatus to at least receive an indication that a view of a task is presented by a first device. At least one memory and the computer program code are also configured to, with the processor, cause the apparatus to cause state information relating to the task to be provided to at least a second device to permit the second device be synchronized with the first device and to present a view of the task, such as the same or a different view than that presented by the first device. In this embodiment, at least one memory and the computer program code are also configured to, with the processor, cause the apparatus to receive information relating to a change in state of the task that is provided by one of the first or second devices while a first view of the task is presented thereupon. Further, at least one memory and the computer program code are also configured to, with the processor, cause the apparatus to cause updated state information related to the task to be provided to another one of the first or second devices to cause the another device to remain synchronized and to update a second view of the task that is presented thereupon. The second view of the task may be the same or different than the first view of the task.

In a further embodiment, a computer program product is provided that includes at least one non-transitory computer-readable storage medium having computer-readable program instructions stored therein with the computer-readable program instructions including program instructions configured to receive an indication that a view of a task is presented by a first device. The computer-readable program instructions of this embodiment also include program instructions configured to cause state information relating to the task to be provided to at least a second device to permit the second device be synchronized with the first device and to present a view of the task, such as the same or a different view than that presented by the first device. In this embodiment, the computer-readable program instructions also include program instructions configured to receive information relating to a change in state of the task that is provided by one of the first or second devices while a first view of the task is presented thereupon. Further, the computer-readable program instructions of this embodiment also include program instructions configured to cause updated state information related to the task to be provided to another one of the first or second devices to cause the another device to remain synchronized and to update a second view of the task that is presented thereupon. The second view of the task may be the same or different than the first view of the task.

In yet another embodiment, an apparatus is provided that includes means for receiving an indication that a view of a task is presented by a first device. The apparatus of this embodiment also includes means for causing state information relating to the task to be provided to at least a second device to permit the second device be synchronized with the first device and to present a view of the task, such as the same or a different view than that presented by the first device. In this embodiment, the apparatus also includes means for receiving information relating to a change in state of the task that is provided by one of the first or second devices while a first view of the task is presented thereupon. Further, the apparatus of this embodiment includes means for causing updated state information related to the task to be provided to another one of the first or second devices to cause the another device to remain synchronized and to update a second view of the task that is presented thereupon. The second view of the task may be the same or different than the first view of the task.

In one embodiment, a method is provided that includes causing a first view of a task to be presented and causing an indication to be provided that the first view of the task is being presented. The method of this embodiment also includes receiving updated state information related to the task that has originated with another synchronized device while a second view of the task is presented by the another device. The second view may be the same or different than the first view. In this embodiment, the method also includes causing an updated first view of the task to be presented based upon the updated state information.

In another embodiment, an apparatus is provided that includes at least one processor and at least one memory including computer program code with at least one memory and the computer program code being configured to, with the processor, cause the apparatus to at least cause a first view of a task to be presented and cause an indication to be provided that the first view of the task is being presented. At least one memory and the computer program code being also configured to, with the processor, cause the apparatus of this embodiment also to receive updated state information related to the task that has originated with another synchronized device while a second view of the task is presented by the another device. The second view may be the same or different than the first view. In this embodiment, at least one memory and the computer program code are also configured to, with the processor, cause the apparatus to cause an updated first view of the task to be presented based upon the updated state information.

In a further embodiment, a computer program product is provided that includes at least one non-transitory computer-readable storage medium having computer-readable program instructions stored therein with the computer-readable program instructions including program instructions configured to cause a first view of a task to be presented and to cause an indication to be provided that the first view of the task is being presented. The computer-readable program instructions of this embodiment also include program instructions configured to receive updated state information related to the task that has originated with another synchronized device while a second view of the task is presented by the another device. The second view may be the same or different than the first view. In this embodiment, the computer-readable program instructions also include program instructions configured to cause an updated first view of the task to be presented based upon the updated state information.

In yet another embodiment, an apparatus is provided that includes means for causing a first view of a task to be presented and causing an indication to be provided that the first view of the task is being presented. The apparatus of this embodiment also includes means for receiving updated state information related to the task that has originated with another synchronized device while a second view of the task is presented by the another device. The second view may be the same or different than the first view. In this embodiment, the apparatus also includes means for causing an updated first view of the task to be presented based upon the updated state information.

BRIEF DESCRIPTION OF THE DRAWINGS

Figure 1:
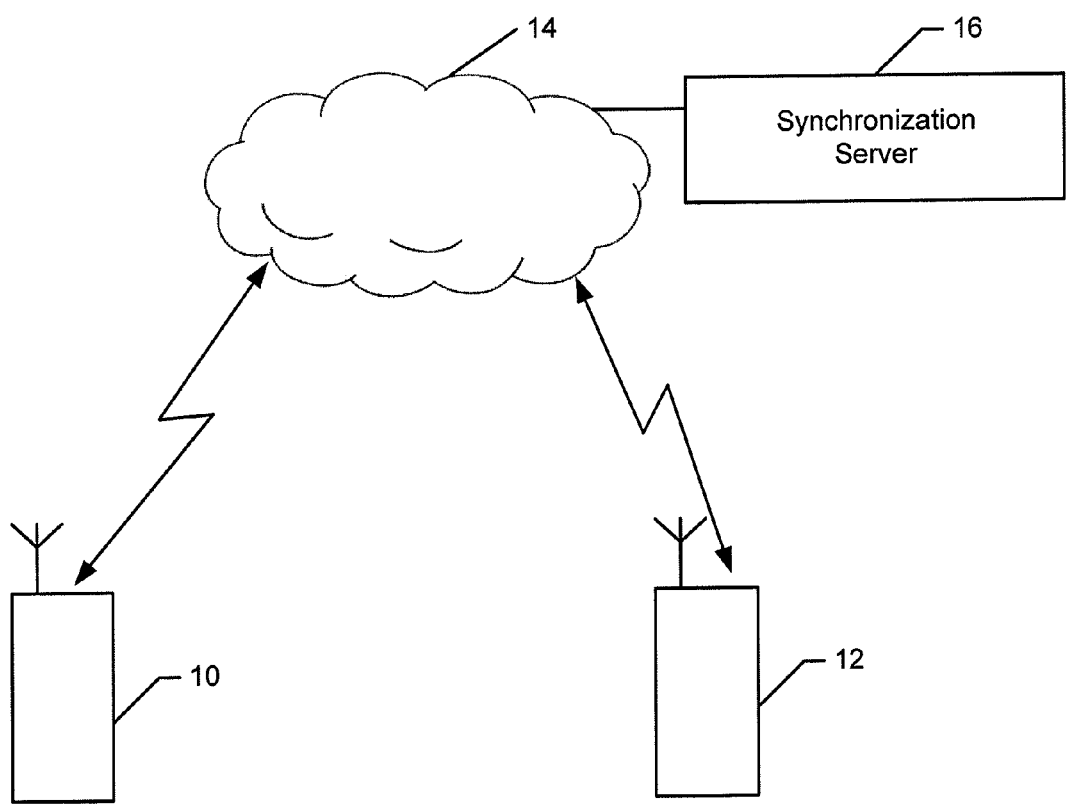
Figure 2:
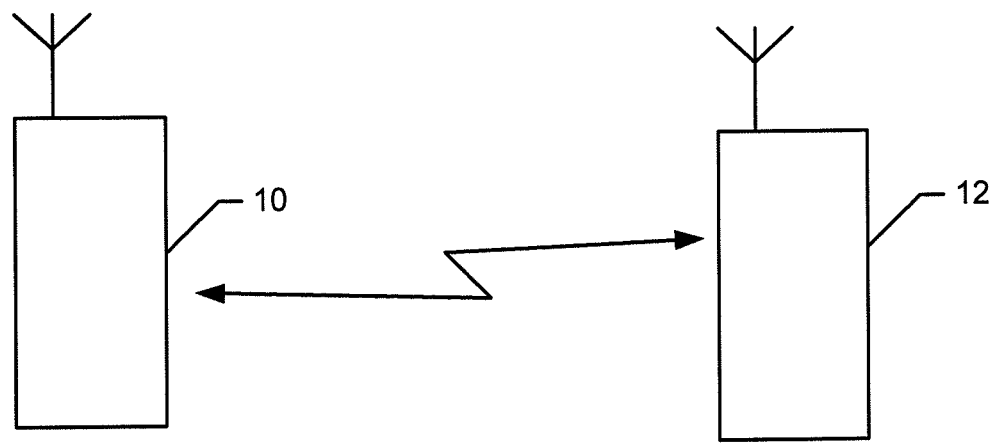
Figure 3:
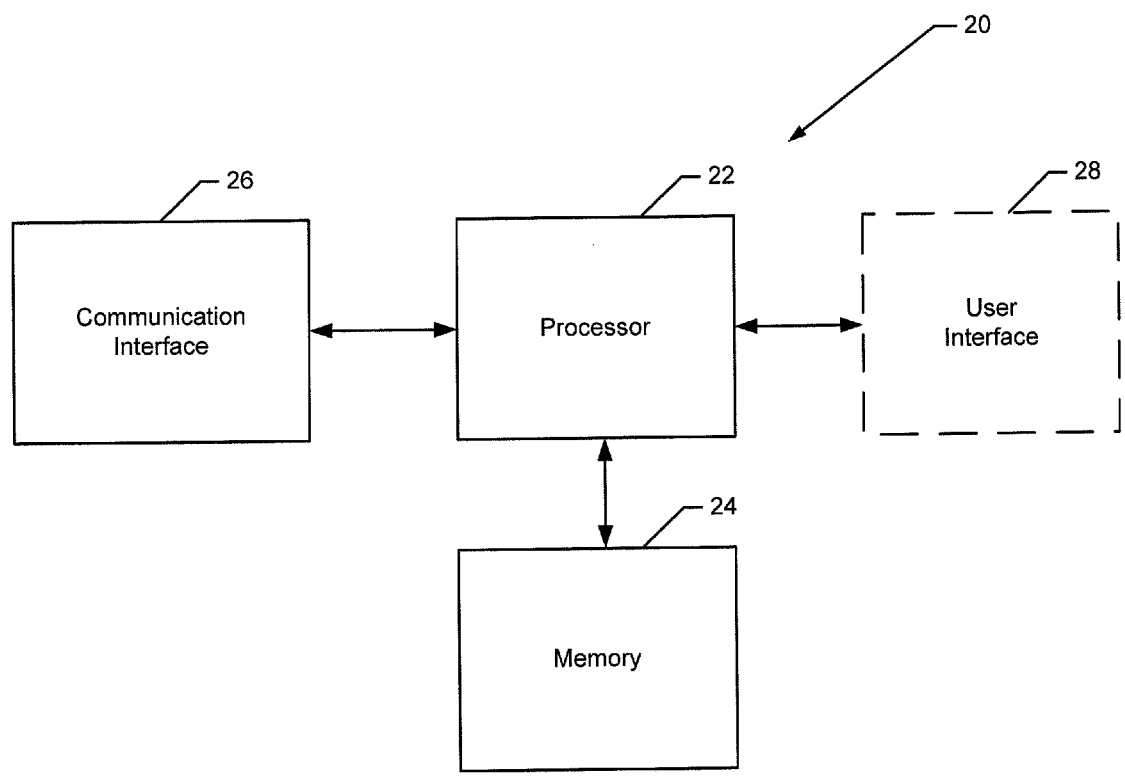
Figure 4:
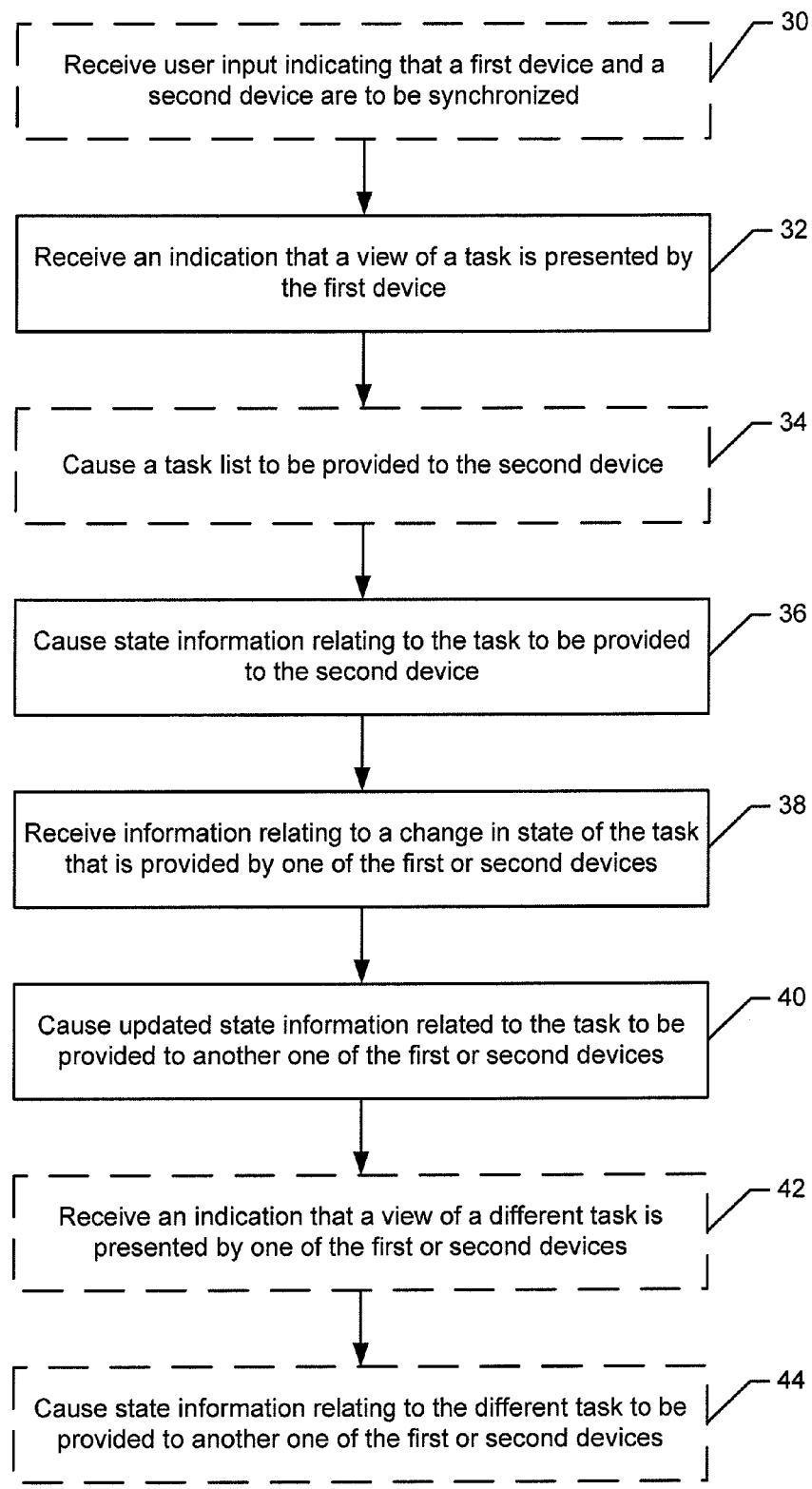
Figure 5:
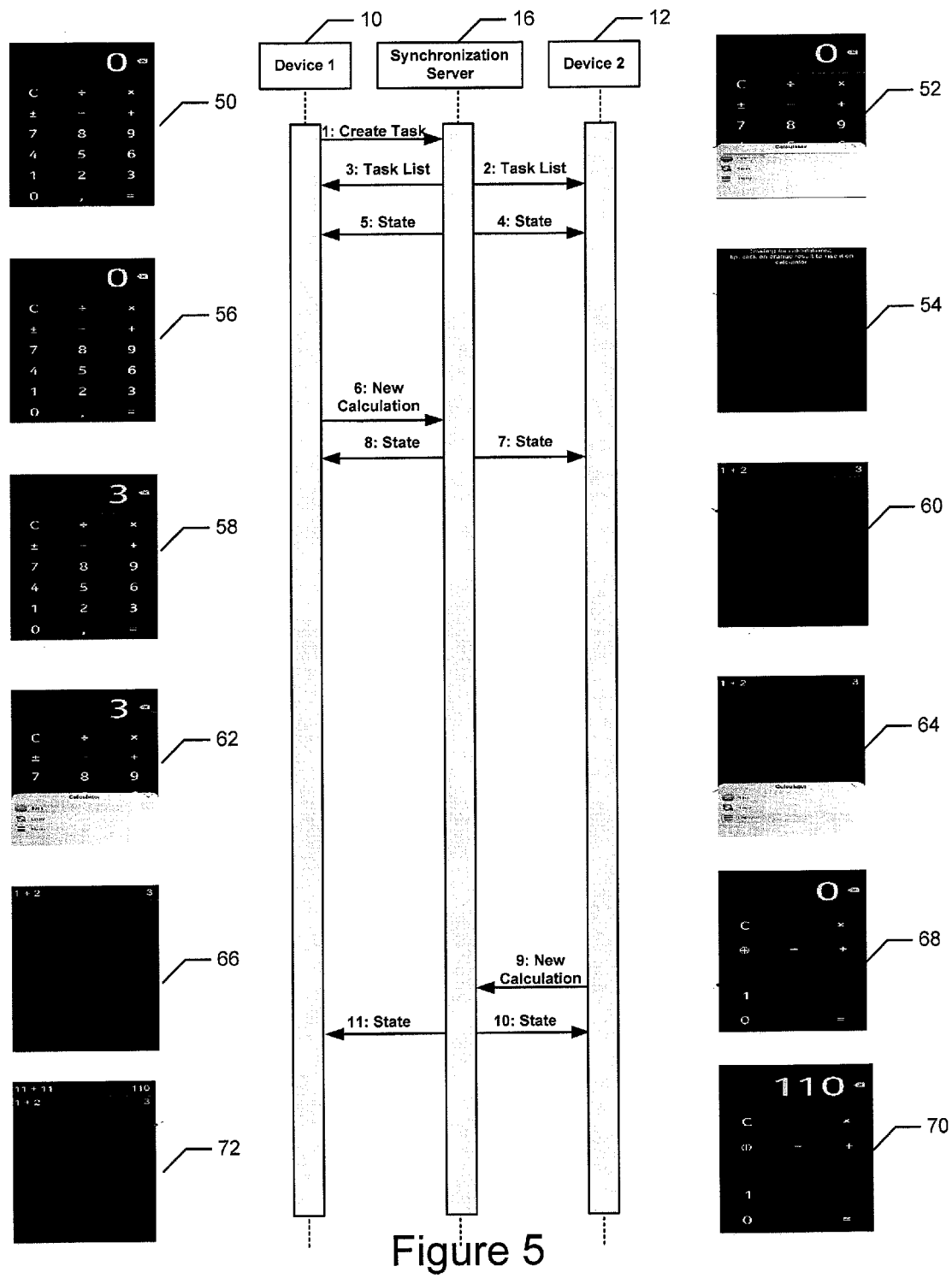
Figure 6:
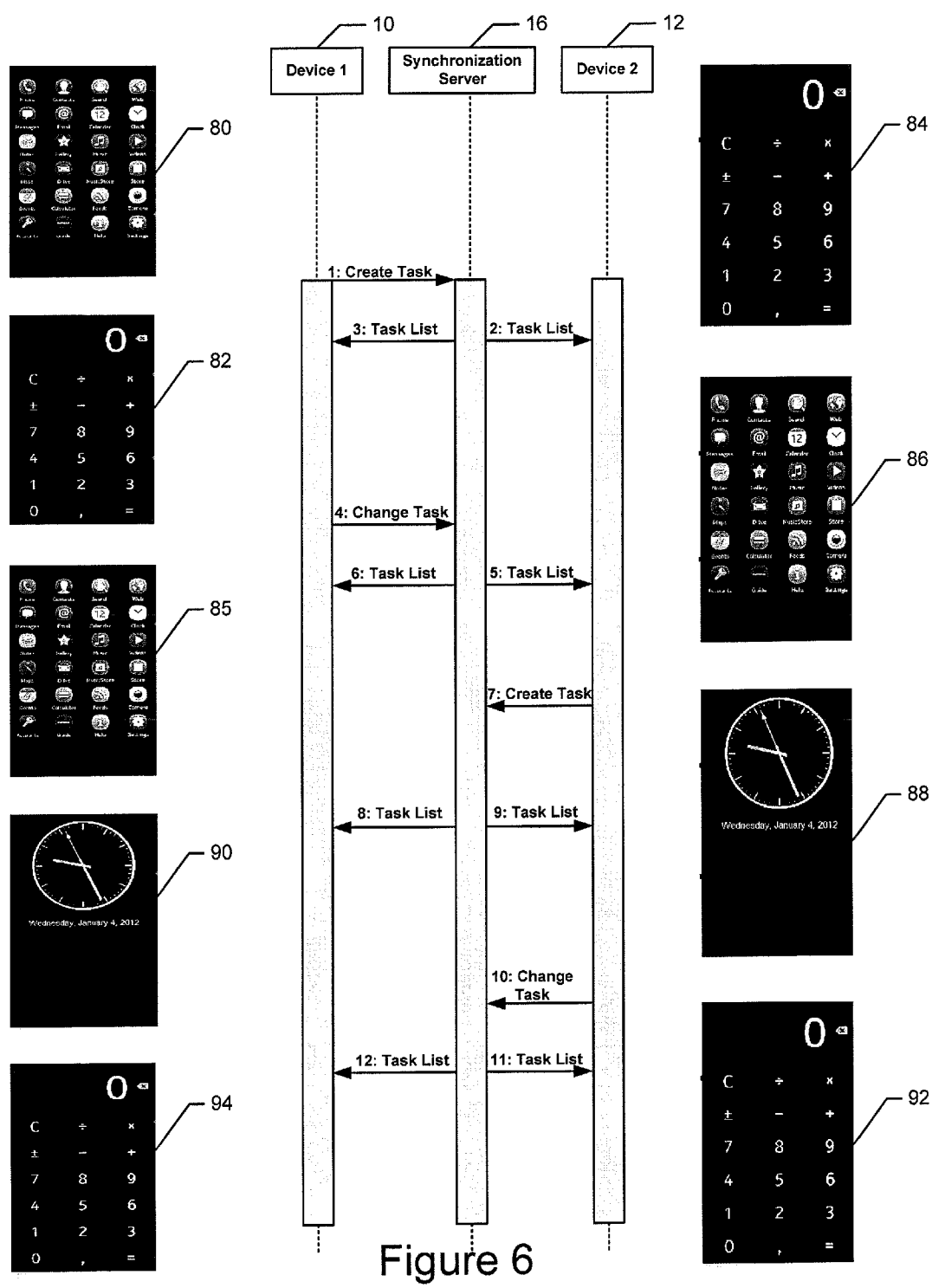
Figure 7:
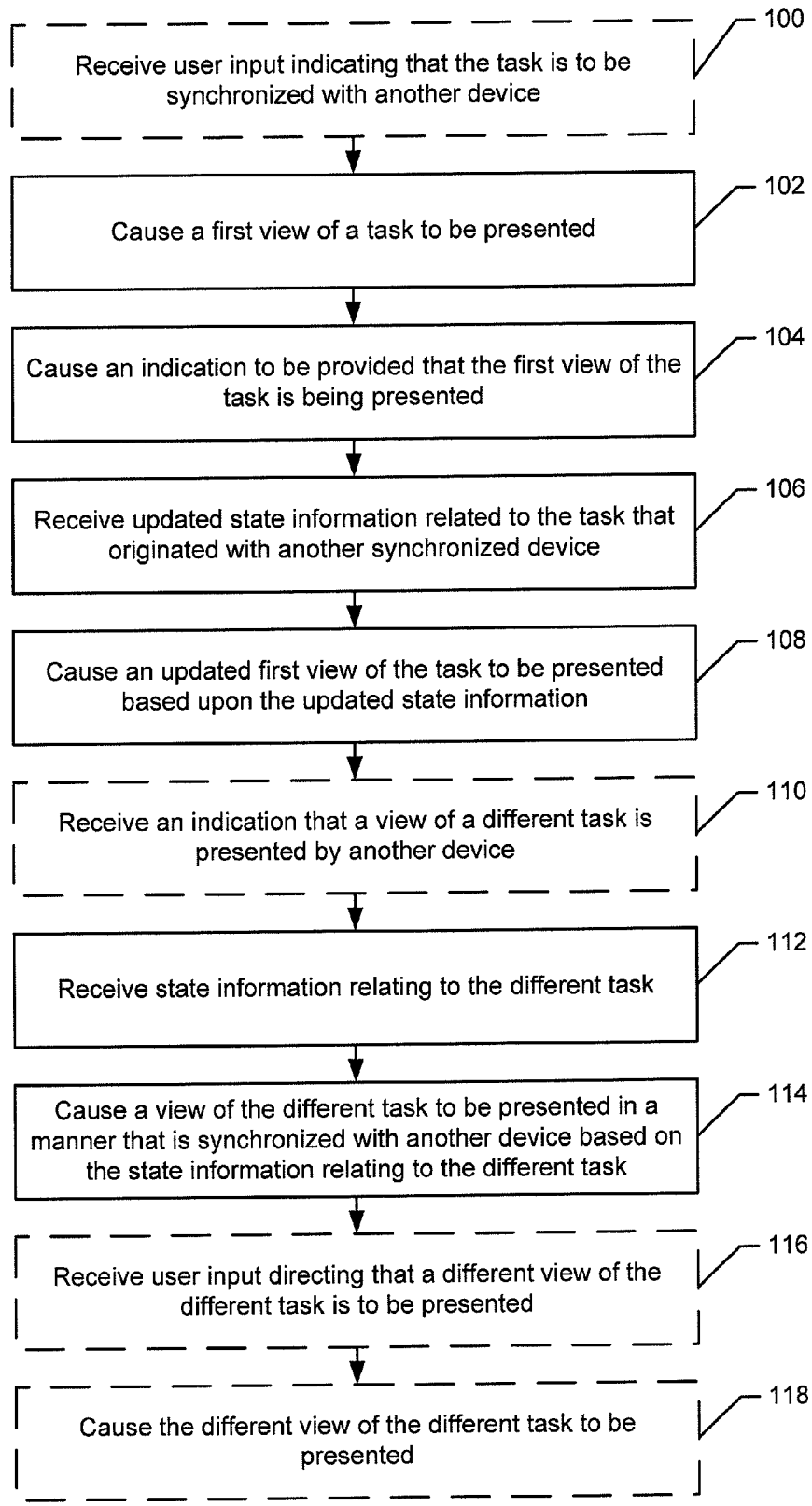

Having thus described certain embodiments of the invention in general terms, reference will now be made to the accompanying drawings, which are not necessarily drawn to scale, and wherein:

FIG. 1 is a schematic representation of a system that includes first and second communication devices and a synchronization server in a communication therewith in accordance with an example embodiment of the present invention;

FIG. 2 is a schematic representation of first and second communication devices configured to directly communicate with one another;

FIG. 3 is a block diagram of an apparatus that may be specifically configured in accordance with an example embodiment of the present invention;

FIG. 4 is a flowchart illustrating operations performed by an apparatus embodied by a synchronization server in accordance with an example embodiment of the present invention;

FIG. 5 is a graphical representation of the views of a task presented by first and second communication devices in accordance with an example embodiment of the present invention;

FIG. 6 is a graphical representation of the views of various tasks presented by first and second communication devices in accordance with an example embodiment of the present invention; and FIG. 7 is a block diagram of the operations performed by an apparatus embodied by a communication device in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided according to an example embodiment in order to facilitate synchronization of two or more communication devices. Various types of communication devices may be synchronized including, for example, mobile telephones, personal digital assistants (PDAs), pagers, laptop computers, tablet computers or any of numerous other hand held or portable communication devices, computation devices, content generation devices, content consumption devices or combinations thereof.

The communication devices may communication with one another in various manners. As shown in FIG. 1, for example, first and second communication devices 10, 12 are each configured to communicate with a network 14, such as via a wireless connection as illustrated or a wireline connection. Various types of networks may support communications between the first and second communication devices including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. As illustrated in FIG. 1 and as described below, a system in accordance with one example of the present invention may also include a synchronization server 16 to facilitate synchronization of the first and second communication devices and, more particularly, to facilitate synchronization of one or more tasks executed by the respective communication devices. The synchronization server may be a network entity that is remote from, but in communication with the first and second communication devices via the network. Alternatively, any one or more of the communication devices may embody the synchronization server in order to provide the synchronization functionality for each of the communication devices.

As another example, first and second communication devices 10, 12 are shown in FIG. 2 to be in direct communication with one another, such as via a wireless connection as illustrated or a wireline connection. In regards to a wireless connection, various types of wireless connections may be utilized in order to facilitate communications between the first and second communication devices including, for example, various proximity-based communications techniques, such as Wi-Fi, near field communications (NFC), Bluetooth™, worldwide interoperability for microwave access (WiMAX) or the like. In the embodiment of FIG. 2, either one or both of the communication devices may include the synchronization server or otherwise be configured to provide the synchronization functionality for facilitating synchronization of the first and second communication devices. While the systems of FIGS. 1 and 2 are shown to include first and second communication devices, the method, apparatus and computer program product of an example embodiment may be utilized in order to synchronize any number of communication devices including two, three or more communication devices.

The first and second communication device 10, 12 and, in an embodiment that includes a distinct synchronization server 16, the synchronization server may each embody or otherwise be associated with an apparatus 20 that is generally depicted in FIG. 3 and that may be configured to perform various operations in accordance with an example embodiment of the present invention as described below, such as in conjunction with FIG. 4 from the perspective of the synchronization server and FIG. 7 from the perspective of a communication device. However, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 20 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the communication device 10, 12, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of a communication device or a distinct synchronization server 16, the processing circuitry may be embodied as a portion of the communications device or the synchronization server.

The user interface 28 (if implemented in embodiments of the apparatus 20 embodied by a communication device 10, 12) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the station by receiving user input and providing output.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry, such as between the first and second communication devices 10, 12 and the synchronization server 16 in the embodiment of FIG. 1 or directly between the first and second communication devices in the embodiment of FIG. 2. In the embodiment of FIG. 1, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. Additionally or alternatively, such as in conjunction with the embodiment of FIG. 2, the communication interface may be configured to transmit and receive information or other signals via a proximity-based communication protocol, such as via Wi-Fi, NFC, Bluetooth™, WiMAX or the like, so as to support communications with other proximately-located devices.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, FIGS. 4 and 7 are flowcharts illustrating the operations performed by a method, apparatus and computer program product, such as apparatus 20 of FIG. 2, from the perspective of the synchronization server 16 (either remote from the communication devices or embodied by one or more of the communication devices) and a communication device, e.g., the first or second communication device 10, 12, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 4 and 7, when executed, convert a computer or processing circuitry into a particular machine configured to perform an example embodiment of the present invention. Accordingly, the operations of FIGS. 4 and 7 define an algorithm for configuring a computer or processing circuitry, e.g., processor, to perform an example embodiment. In some cases, a general purpose computer may be provided with an instance of the processor which performs the algorithm of FIGS. 4 and 10 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIGS. 4 and 7. It should be appreciated that each of the modifications, optional additions or amplifications below may be included with the operations above either alone or in combination with any others among the features described herein.

Referring now to FIG. 4, the operations performed by an apparatus 20 embodied as a synchronization server 16 are illustrated. As noted above, the synchronization server may be a network entity, remote from each of the communication devices, or may be embodied by one or more of the communication devices that are to be synchronized. Regardless, the apparatus may include means, such as the processor 22, the communication interface 26, the user interface 28 or the like, for receiving user input indicating that a first device 10 and a second device 12 are to be synchronized. See block 30 of FIG. 4. Various types of user input may be provided in order to indicate that the first and second devices are to be synchronized. In one embodiment, the user may perform a swipe gesture in order to indicate that the respective device is to be synchronized with another device. While various swipe gestures may be utilized, the apparatus, such as the processor, communication interface, the user interface or the like, may be configured to receive and recognize a gesture in which two fingers of the user are placed on a lower portion of a touchscreen or other touch sensitive input device and are moved upwardly while the fingers remain spaced apart from one another, thereby tracing a pair of generally parallel lines extending from a lower portion to an upper portion of the touchscreen or other touch sensitive input device. The user may provide an indication to each of the devices that are to be synchronized and each of the devices may cause an indication of the user input to be provided to the synchronization server. The synchronization server may include a listing or other record of communication devices that may be synchronized, such as the communication devices owned or otherwise utilized by a respective user. In response to receipt of an indication from two or more of the communication devices that may be synchronized, the synchronization server may then provide for the synchronization of the devices.

Following receipt of the indication that two or more devices are to be synchronized, the apparatus 20 embodied by the synchronization server 16 may include means, such as the processor 22, the communication interface 26 or the like, for receiving an indication that a view of a task is presented by the first device 10. See block 32 of FIG. 4. In this regard, the user may open or launch a task with an indication being provided that a view of the task that was opened or launched is presented by the first device. Various tasks may be supported and executed by a communication device, including a variety of different applications. As shown at 50 in FIG. 5, however, a first device can launch a calculator application and an indication, e.g., the message entitled Create Task, may be provided to the synchronization server that indicates that the calculator application has been launched.

In response to the indication that a view of a task is presented by the first device 10, the apparatus 20 embodied by the synchronization server 16 may also include means, such as the processor 22, the communication interface 26 or the like, for causing a task list or other identification of the tasks that are active to be provided at least to the other devices, e.g., the second device 12, and, in some instances, to all of the devices including both the first and second devices as shown by the messages entitled Task List in FIG. 5. See block 34 of FIG. 4. The task list identifies the tasks that are active on either device such that each device may correspondingly activate the same tasks. In addition, the task list may identify the task for which a view is currently presented in the foreground by the first device, such as the calculator application.

The apparatus 20 embodied by the synchronization server 16 may also include means, such as the processor 22, the communication interface 26 or the like, for causing state information relating to the task to be provided at least to the other devices, e.g., the second device 12, and, in one embodiment, to each of the devices including the first and second devices as shown by the messages entitled State in FIG. 5. See block 36 of FIG. 3. The state information identifies the current state of the task for which a view is presented by the first device 10. The state information may be provided in the same message, e.g., the Create Task message, as that which provides the indication that a view of a task is presented by the first device, or the state information may be provided in a different message. In response to the identification of the task in the task list and the state information, the second device may launch the same task, such as a calculator application, or may otherwise bring the same task to the foreground and may cause a view to be presented with the task being in the same state as the task on the first device, thereby synchronizing the task between the first and second devices.

Although the views of the task presented by the first and second devices may be the same, in accordance with an example embodiment, the second device 12 may be configured to cause a different view of the same task to be presented. In this embodiment, both of the first and second devices may continue to execute the same task and the state of the task may continue to be synchronized therebetween. Additionally, both of the first and second devices of this embodiment may continue to cause a view generated by the same task (in the same state) to be presented in the foreground, but the type of view that is generated by the task and presented by the second device may be different than that presented by the first device. As shown in FIG. 5, for example, the second device may receive user input at 52 indicating that a history view of the calculator task is to be shown as depicted at 54, even though the first device continues to present a decimal view of the calculator task at 56.

Regardless of whether the same or different views of the same task are presented by the first and second devices 10, 12, the task remains synchronized between the first and second devices. In this regard, the apparatus 20 embodied by the synchronization server 16 may include means, such as the processor 22, the communication interface 28 or the like, for receiving information relating to a change in state of the task as provided by one of the first and second devices. See block 38 of FIG. 4. The information regarding a change in state may be provided by any of the synchronized devices. With respect to the example of FIG. 5, the first device may receive user input requesting that the sum of 1+2 be computed as shown in 58. Thus, the first device may cause an indication to be provided to the synchronization server indicative of a change in the state of the task and including a definition of the new or current state of the task as shown, for example, by the New Calculation message of FIG. 5.

The apparatus 20 embodied by the synchronization server 16 may also include means, such as the processor 22, the communication interface 26 or the like, for causing updated state information related to the task to be provided to another one of the first or second devices and, in one embodiment, to each of the first and second devices 10, 12. See block 40 of FIG. 4. In the example illustrated in FIG. 5, the synchronization server causes state information to be provided to each of the first and second devices via the State messages based upon the new calculation performed by the task as executed by the first device. Based upon the updated state information, the second device may cause the history view of the same calculation to be presented as shown at 60.

By way of further illustration as to the manner in which the views of the same task may be different between the first and second devices 10, 12, the example of FIG. 5 also illustrates at 62 the view of the first device being changed so as to present a history view of the calculator task and at 64 the view of the second device being changed to present a binary calculation view of the calculator task. Following the change in views of the tasks by the first and second devices, a history view may be presented by the first device as shown at 66 and a binary calculation view may be presented by the second device as shown at 68. Thereafter, the interaction by the user with either the first and second devices may cause the state information relating to the task to change, such as shown at 70 in which the sum of the binary values 11 and 11 is computed. As described above and as shown in FIG. 5, an indication of the new calculation including the state information associated with the new calculation may be provided to the synchronization server 16, such as via a New Calculation message, for distribution to at least the other device or, in some embodiments, each of the devices, such as via a State message, such that the different views of the same task may be synchronized based upon the updated state information as shown at 72.

As described above, the method, apparatus and computer program product of an example embodiment permit the same or different views of the same task to be presented upon different devices, but to remain in synchronization as the user interacts with the various devices and/or as the state of the task otherwise changes. Additionally, the method, apparatus and computer program product of one example embodiment permits the view of the task that is presented by each of the devices to be different so as to provide increased flexibility with respect to the manner in which the various views of the task are displayed. A user may therefore consider more information regarding the task or at least different representations of the same information regarding the task by reviewing the different views of the task presented by the multiple devices.

As shown in FIG. 6, the method, apparatus and computer program product of another example embodiment may cause the same view of the same task to be presented upon the display of each of the first and second devices 10, 12, while allowing a change in the task for which a view is presented in the foreground on one device to automatically cause a similar change in the task for which a view is presented by the other device. By way of example, the first and second devices may be synchronized as described above in order to present an icon view of a home screen task that depicts selectable icons of a plurality of applications that may be executed by the devices. In response to the user's selection of the calculator icon as presented by the first device, the first device may launch the calculator task or otherwise bring the calculator task to the foreground, thereby switching from the icon view of the home screen task as shown at 80 to a decimal view of the calculator task as shown at 82. As described above, the first device may also cause an indication of the task that has been selected and the view of the task, including, for example, the state information for the task, that is now presented to be provided to the synchronization server 16. Thus, the apparatus 20 embodied by the synchronization server of this embodiment may include means, such as the processor 22, the communication interface 26 or the like, for receiving an indication that a view of a different task is presented by one of the synchronized devices, such as the first device in the foregoing example. See block 42 of FIG. 4 as well as the Create Task message (Message 1) of FIG. 6. Along with the indication that view of a different task is now presented by one of the synchronized device, the apparatus embodied by the synchronization server, such as the processor, the communication interface or the like, may also receive state information for the different task.

The apparatus 20 embodied by the synchronization server 16 of this embodiment may also include means, such as the processor 22, the communication interface 26 or the like, for causing a task list or other indication of the task that has been activated as well as the view of the task that is presented by the first device to be provided to the other devices and, in one embodiment, to each of the devices as shown by the Task List messages (Messages 2 and 3) of FIG. 6. The apparatus embodied by the synchronization server may also include means, such as the processor, the communication interface or the like, for causing state information relating to the different task for which a view is now presented to be provided to the other devices and, in one embodiment, to each of the other devices. See block 44 of FIG. 4. In one embodiment, the state information may be provided concurrent with the task list or other indication that a different task has been activated.

In response, the other devices, such as the second device 12, may correspondingly cause a decimal view of the calculator task to also be presented as shown at 84. As shown at 85, the user may then change the task that is to be presented in the foreground, such as by swiping the touchscreen in order to remove the decimal view of the calculator task and to again present the icon view of the home screen task. In response to this change in the task for which a view is displayed, an indication of the change in the displayed task may be provided to the synchronization server 16 which may, in turn, advise the other devices. See the Change Task (Message 4) and Task List (Messages 5 and) messages of FIG. 6. The other devices may then present the same view, such as the icon view, of the same task, such as the home screen task, as shown at 86.

In this embodiment, the change in task may be provided via any one of the devices so as to cause a change in the view of the task at each of the other synchronized devices. For example, a user of the second device 12 may select the clock icon so as to cause an analog view of the clock task to be presented as shown at 88. As described above, the second device may cause an indication of the task that has been selected and the view of the selected task that is presented (as well as the state information) to be provided to the synchronization server 16, such as via a Create Task message (Message 7) for distribution, such as in a Task List message (Messages 8 and 9), to the other devices. In this example, the first device 10 may, in turn, cause the analog view of the clock task to be similarly presented as shown at 90.

By way of one additional example, the user of the second device 12 may then perform a swipe gesture to remove the analog view of the clock task and to restore the decimal view of the calculator task as shown at 92. The second device may, in turn, cause an indication of the change in task by providing an indication of the task that is now presented as well as the view of the task that is now presented (and the state information) to the synchronization server 16, such as via a Change Task message (Message 10) for distribution to the other devices, such as in the form of a Task List message (Messages 11 and 12). As described above, the other devices, such as the first device 10, may then cause the same view of the newly selected task, such as the decimal view of the calculator task as shown at 94, to be presented, thereby maintaining the views presented by the various devices in synchronization even as the task for which a view is displayed is changed, such as based upon user input.

Referring now to FIG. 7, the operations performed by an apparatus 20 embodied by or otherwise included within one or more of the first and second devices 10, 12 are depicted. As shown in block 100, the apparatus embodied by a communication device may include means, such as the processor 22, the user interface 28 or the like, for receiving user input indicating that a task is to be synchronized with another device. As described above, various types of user input may be recognized including a swipe gesture, such as the upward movement of a pair of spaced apart fingers. As shown in block 102, the apparatus embodied by communication device may also include means, such as the processor, the user interface or the like, for causing a first view of a task to be presented. Additionally, the apparatus embodied by the communication device may include means, such as the processor, the communication interface 26 or the like, for causing an indication to be provided that the first view of the task is being presented, such as a Create Task message as shown in FIG. 5. See block 104 of FIG. 7.

The apparatus 20 embodied by the communication device may also include means, such as a processor 22, the communication interface 26 or the like, for receiving updated state information related to the task that originated with another synchronized device. See block 106 of FIG. 7. As described above in conjunction with FIGS. 4 and 5, the state of the task may be effected by the operations performed by another communication device, such as based upon user input received by the other communication device. Based upon the updated state information, the apparatus embodied by the communication device may include means, such as the processor, the user interface 28 or the like, for causing an updated first view of the task to be presented. See block 108. For example, the performance of a new calculation by a calculator task that is presented by one device may cause an updated history view of the calculator task to be presented by another synchronized device.

As described above in conjunction with FIG. 6, the apparatus 20 embodied by the communication device may also include means, such as the processor 22, the communication interface 26 or the like, for receiving an indication that a view of a different task is presented by another device as well as receiving state information relating to the different task. See blocks 110 and 112 of FIG. 7. For example, the first device 10 of FIG. 6 may receive an indication that the task that is now presented by the second device 12 has changed from the calculator task to the home screen task. The apparatus embodied by the communication device may also include means, such as the processor, the user interface 28 or the like, for causing a view of the different task to be presented in a manner that is synchronized with the other device based upon the state information relating to the different task. See block 114 of FIG. 7. As shown at 82 and 85 in FIG. 6, for example, the view presented by the first device may change from the decimal view of the calculator task to the icon view of the home screen task so as to remain synchronized with the second device.

The apparatus 20 embodied by the communication device may also include means, such as the processor 22, the user interface 28 or the like, for receiving user input directing that a different view of the different task is to be presented. See block 116 of FIG. 7. For example, the first device may receive user input at 60 that indicates that the decimal view of the calculator task is to be changed to a history view of the calculator task as shown at 64 of FIG. 6. The apparatus embodied by the communication device may also include means, such as the processor, the user interface or the like, for causing the different view of the different task to be presented. See block 118.

As described, the method, apparatus and computer program product of example embodiments permit multiple devices to be synchronized and, more particularly, permit the tasks executed by the devices to be synchronized. In one embodiment, the method, apparatus and computer program product permit different views of the same task to be presented by the different devices in order to allow a user to obtain additional information regarding the task by reference to the different views presented by the various devices. Alternatively, the method, apparatus and compute program product of another example embodiment may cause the same view of the same task to be presented in a synchronized manner by each of the devices. However, the method, apparatus and computer program product of this example embodiment may permit the task and/or the view of the task as is presented to be changed in response to user input provided via any one of the communication devices, thereby further facilitating the flexibility with which the user may utilize an embodiment of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an indication that a view of a task is presented by a first device;
   causing state information relating to the task to be provided to at least a second device to permit the second device to be synchronized with the first device;
   causing the second device to present a different view of the task than that presented by the first device, wherein the different view of the task is determined by the second device in response to a user input at the second device;
   receiving information relating to a change in state of the task that is provided by one of the first or second devices while a first view of the task is presented thereupon; and
   causing updated state information related to the task to be provided to another one of the first or second devices to cause the another device to remain synchronized and to update a second view of the task that is presented thereupon.

2. The method according to claim 1 further comprising receiving user input indicating that the task is to be synchronized with the second device.

3. The method according to claim 2 wherein receiving the user input comprises receiving a swipe gesture defined by two fingers spaced from one another while being swiped.

4. The method according to claim 1 further comprising causing updated state information related to the task to be provided to the first and second devices in response to receiving the information relating to the change in state of the task.

5. The method according to claim 1 further comprising causing a task list to be provided at least to the second device in response to receiving the indication that the view of the task has been presented by the first device.

6. The method according to claim 1, further comprising:
causing state information relating to the task to be provided to a third device from the second device to permit the third device to be synchronized with at least one of the first device or the second device, wherein the third device presents a different view of the task than the first device or the second device.

7. The method according to claim 1 further comprising:
receiving an indication that a view of a different task is presented by one of the first or second devices; and
causing state information relating to the different task to be provided to another one of the first or second devices to permit the another device to remain synchronized and to present a different view of the different task.

8. An apparatus comprising at least one processor and at least one memory including computer program code, the at least one memory and the computer program code configured to, with the processor, cause the apparatus to at least:
receive an indication that a view of a task is presented by a first device;
cause state information relating to the task to be provided to at least a second device to permit the second device to be synchronized with the first device;
cause the second device to present a different view of the task than that presented by the first device, wherein the different view of the task is determined by the second device in response to a user input at the second device;
receive information relating to a change in state of the task that is provided by one of the first or second devices while a first view of the task is presented thereupon; and
cause updated state information related to the task to be provided to another one of the first or second devices to cause the another device to remain synchronized and to update a second view of the task that is presented thereupon.

9. The apparatus according to claim 8 wherein the at least one memory and the computer program code further configured to, with the processor, cause the apparatus to receive user input indicating that the task is to be synchronized with the second device.

10. The apparatus according to claim 9 wherein the at least one memory and the computer program code are configured to, with the processor, cause the apparatus to receive the user input by receiving a swipe gesture defined by two fingers spaced from one another while being swiped.

11. The apparatus according to claim 8 wherein the at least one memory and the computer program code are further configured to, with the processor, cause the apparatus to cause updated state information related to the task to be provided to the first and second devices in response to receiving the information relating to the change in state of the task.

12. The apparatus according to claim 8 wherein the at least one memory and the computer program code are further configured to, with the processor, cause the apparatus to cause a task list to be provided at least to the second device in response to receiving the indication that the view of the task has been presented by the first device.

13. The apparatus according to claim 8 wherein the at least one memory and the computer program code further configured to, with the processor, cause the apparatus to:
receive an indication that a view of a different task is presented by one of the first or second devices; and
cause state information relating to the different task to be provided to another one of the first or second devices to permit the another device to remain synchronized and to present a different view of the different task.

14. A method comprising:
causing a first view of a task to be presented;
causing an indication to be provided that the first view of the task is being presented;
receiving updated state information related to the task that has originated with another synchronized device while a second view of the task is presented by the another device, wherein the second view of the task is different from the first view of the task, and wherein the second view of the task is determined by the another device in response to receiving a user input at the another device; and
causing an updated first view of the task to be presented based upon the updated state information.

15. The method according to any one of claim 14 further comprising receiving user input indicating that the task is to be synchronized with the another device.

16. The method according to claim 15 wherein receiving the user input comprises receiving a swipe gesture defined by two fingers spaced from one another while being swiped.

17. The method according to claim 14 wherein the second view is different than the first view.

18. The method according to claim 14 further comprising:
receiving an indication that a view of a different task is presented by the another device;
receiving state information relating to the different task; and
causing a view of the different task to be presented in a manner that is synchronized with the another device based upon the state information relating to the different task.

19. The method according to claim 18 further comprising:
receiving user input directing that a different view of the different task is to be presented than that presented by the another device;
causing the different view of the different task to be presented,
wherein the different view of the different task remains synchronized with the another device based upon the state information relating to the different task.

20. An apparatus comprising at least one processor and at least one memory including computer program code, the at least one memory and the computer program code configured to, with the processor, cause the apparatus to at least:
cause a first view of a task to be presented;
cause an indication to be provided that the first view of the task is being presented;
receive updated state information related to the task that has originated with another synchronized device while a second view of the task is presented by the another device, wherein the second view of the task is different from the first view of the task, and wherein the second view of the task is determined by the another device in response to receiving a user input at the another device; and
cause an updated first view of the task to be presented based upon the updated state information.

* * * * *